United States Patent
Tee et al.

(10) Patent No.: US 10,259,062 B2
(45) Date of Patent: Apr. 16, 2019

(54) PULSE AND GAP CONTROL FOR ELECTRICAL DISCHARGE MACHINING EQUIPMENT

(71) Applicant: ANCA PTY LTD, Victoria (AU)

(72) Inventors: Kotler Ter Pey Tee, Victoria (AU); Patrick Gerard Boland, Victoria (AU); Reza Hosseinnezhad, Victoria (AU); Milan Brandt, Victoria (AU); John Mo, Victoria (AU); Lijiang Qin, Bayswater North (AU)

(73) Assignee: ANCA PTY LTD, Victoria (AU)

( * ) Notice: Subject to any disclaimer, the term of this patent is extended or adjusted under 35 U.S.C. 154(b) by 354 days.

(21) Appl. No.: 14/764,401

(22) PCT Filed: Feb. 4, 2014

(86) PCT No.: PCT/AU2014/000076
§ 371 (c)(1),
(2) Date: Jul. 29, 2015

(87) PCT Pub. No.: WO2014/117226
PCT Pub. Date: Aug. 7, 2014

(65) Prior Publication Data
US 2015/0360310 A1    Dec. 17, 2015

(30) Foreign Application Priority Data
Feb. 4, 2013   (AU) ................................ 2013900377

(51) Int. Cl.
B23H 7/32     (2006.01)
B23H 1/02     (2006.01)
(Continued)

(52) U.S. Cl.
CPC ............... *B23H 7/32* (2013.01); *B23H 1/022* (2013.01); *B23H 1/024* (2013.01); *B23H 7/12* (2013.01); *B23H 7/26* (2013.01)

(58) Field of Classification Search
CPC .......... B23H 1/022; B23H 1/024; B23H 7/12; B23H 7/32
See application file for complete search history.

(56) References Cited

U.S. PATENT DOCUMENTS 3,705,286 A * 12/1972 Kondo ..................... B23H 7/20
219/69.13
4,287,403 A      9/1981 Sato
(Continued)

FOREIGN PATENT DOCUMENTS

GB     1508189 A * 4/1978
JP     04-354621 A * 12/1992

OTHER PUBLICATIONS

Chinese Office Action for corresponding application 201480003672.6; Report dated Dec. 20, 2016.
(Continued)

*Primary Examiner* — Geoffrey S Evans
(74) *Attorney, Agent, or Firm* — Cantor Colburn LLP

(57) ABSTRACT

A method of detecting the state of a gap between an electrode and a workpiece in electrical discharge machining (EDM) equipment, the method including the steps of: prior to generating an electrical discharge to remove material from the workpiece, applying a low energy checking pulse across the gap during a checking phase period ($T_c$); and inferring a short circuit gap state when the gap current exceeds a current threshold ($I_T$).

8 Claims, 9 Drawing Sheets

(51) Int. Cl.
*B23H 7/12* (2006.01)
*B23H 7/26* (2006.01)

(56) References Cited

U.S. PATENT DOCUMENTS

| | | | | |
|---|---|---|---|---|
| 4,376,880 A * | 3/1983 | Inoue | ................. | B23H 1/024 |
| | | | | 219/69.13 |
| 4,504,722 A * | 3/1985 | Kishi | ................. | B23H 1/02 |
| | | | | 219/69.13 |
| 4,533,811 A * | 8/1985 | Buhler | ................. | B23H 1/02 |
| | | | | 219/69.16 |
| 4,700,039 A * | 10/1987 | Konno | ................. | B23H 7/16 |
| | | | | 219/69.13 |
| 4,703,144 A | 10/1987 | Goto | | |
| 5,352,859 A * | 10/1994 | Kaneko | ................. | B23H 7/20 |
| | | | | 219/69.13 |
| 5,410,118 A * | 4/1995 | Boccadoro | ............. | B23H 7/16 |
| | | | | 219/69.13 |
| 5,453,593 A * | 9/1995 | Seok-Yong | ............ | B23H 7/16 |
| | | | | 219/69.13 |
| 5,496,984 A * | 3/1996 | Goto | ................. | B23H 7/16 |
| | | | | 219/69.13 |
| 5,604,677 A | 2/1997 | Brien | | |
| 5,904,865 A | 5/1999 | Jariabek | | |
| 6,127,642 A * | 10/2000 | Gleason | ............. | B23H 9/14 |
| | | | | 219/69.15 |
| 6,169,261 B1 * | 1/2001 | Li | ................. | B23H 1/022 |
| | | | | 219/69.13 |
| 6,472,630 B1 * | 10/2002 | Lin | ................. | B23H 1/02 |
| | | | | 219/69.13 |
| 7,202,438 B2 | 4/2007 | Asai | | |
| 8,168,714 B2 | 5/2012 | Stanga | | |
| 2005/0145603 A1 | 7/2005 | Goto | | |
| 2008/0017615 A1* | 1/2008 | Yoneda | ................ | B23H 1/022 |
| | | | | 219/69.16 |
| 2009/0134126 A1 * | 5/2009 | Katougi | ................ | B23H 1/022 |
| | | | | 219/69.13 |
| 2010/0096364 A1 | 4/2010 | Balemi | | |

OTHER PUBLICATIONS

International Search Report for corresponding application PCT/AU2014/000076 filed Feb. 4, 2014; dated Mar. 21, 2014.

* cited by examiner

PULSE AND GAP CONTROL FOR ELECTRICAL DISCHARGE MACHINING EQUIPMENT

FIELD

The present invention relates generally to control devices and methods for electrical discharge machining equipment and processors.

ELECTRICAL DISCHARGE MACHINING

Electrical discharge machining (EDM) is a process involving the removal of conductive and semi conductive material by application of a series of rapidly recurring current discharges between an electrode and a workpiece in the presence of a dielectric. The electrode and the tool are separated by a gap distance, typically of between 0.001 mm to 0.02 mm, and a spark discharge is produced by controlling DC voltage pulses between the electrode and the workpiece in order to achieve precision machining of the workpiece.

One of the challenging tasks for stable and efficient machining using EDM technology is the monitoring and control of electrical discharge gap status. Electrical discharge occurs over a very short period of time in a very narrow gap filled with dielectric.

In electrical discharge machining, in order to increase the eroding efficiency, and to improve process stability and prevent continuous occurrence of inefficient and harmful pulses, an efficient algorithm for detecting of the short circuit and arcing gap condition and the controlling of relevant pulse timing is required. False detection of gap condition can either cause reduction in pulse frequency or inefficiency of removing debris from the gap which in turn can cause formation of slag and poor gap control performance.

This therefore results in the instability of the eroding process and low material removal rate.

U.S. Pat. No. 5,904,865 discloses a method to prevent the formation of slug by controlling the rate of debris production and the average debris particle size. It controls both the average power level and the $T_{on}$ (On Time) power level supplied to the gap. The average power level considers the complete spark time including off-time, but the $T_{on}$ power level control considers the operating parameters which affect only during the $T_{on}$ time. The method is based on the assumption that reducing the average power supplied to the gap will reduce the accumulation of debris in the gap, thus increasing the erosion rate.

U.S. Pat. No. 8,168,914 B2 discloses a method of reducing the electrode wear and the damage to the workpiece to be machined by appropriately controlling the short circuit current via interrupting the predetermined time period of the pulse train that turns on and off the power module that supplies discharge power to the machining gap. Its method of detecting the short circuit is by applying a series of pulse trains and comparing the inter-electrode voltage at the end of the first pulse in the pulse trains with a predetermined threshold which is designed to be a value close to 0V.

U.S. Pat. No. US2010/0096364 A1 discloses a method of controlling the relative movement of the tool electrode within the time interval of current erosion cycle based on the deviation of the measured value from the desire reference value of the significant process parameters of previous erosion cycle and current erosion cycle. The time intervals of previous and current erosion cycles are separated by a process pause cycle which includes a jump motion of the tool electrode from the workpiece. The significant process parameters include at least one of: ignition delay time, a mean pulse voltage and a discharge voltage.

U.S. Pat. No. 7,202,438 B2 discloses an electric discharge machining apparatus that corrects the required amount of material to be removed for machining a workpiece based on the history of the eroding process, and a machining control unit that controls the position of the electrode based on the sum of the machined material by the eroding process. The machining amount calculating unit calculates the necessary amount of material to be removed from the workpiece based on the accumulation of material removed by the discharging process and converts it to the required number of discharge pulses to machine the required amount of material. The accumulated machining amount calculating unit updates the sum of removed material based on the total amount of effective discharge pulses provided by discharge-pulse detecting unit. Discharge-pulse detecting unit detects the types of pulses based on the magnitude of the high frequency components in the gap voltage. A discharge pulse will be classified as effective discharge pulse (normal discharge pulse) when the magnitude of high frequency components is larger than a threshold. A discharge pulse will be classified as arc discharge when the magnitude of high frequency components in gap voltage is lower than the effective discharge pulse threshold.

EDM equipment also includes a gap controller for controlling the feed rate of the workpiece towards the electrode so as to maintain an optimum gap distance between the workpiece and electrode for achieving precision and efficient machining. Such gap controllers relying upon an average gap voltage feedback signal are commonly used in the industry. This method presents several problems. Firstly, using an average gap voltage makes it very hard to accurately discriminate between short circuit and arcing conditions and normal discharge, as the average gap voltage value at normal gap condition can be very close to short circuit condition's value. Secondly, different open circuit voltages can result in different average gap voltages depending on gap conditions: normal or short circuit, thus different feedrate controller gain is required. Thirdly, average gap voltage is also affected by material conductivity of the workpiece. For the same gap conditions, lower conductivity materials lead to higher average gap voltages. Consequently, a small average gap voltage could mean short circuit for higher conductivity materials but a normal condition for lower conductivity materials. This complexity involved in using average gap voltage values for control purposes could result in process instability when eroding an area that consists of two materials having different conductivities. Finally, average gap voltage is also found to be sensitive to gap condition disturbances including air pocket in the gap, run-out of electrode, dielectric condition and the speed of electrode rotation. These gap condition disturbances fluctuate at a rate that is too high for a CNC machine to respond to, therefore having average gap voltage as a feedback signal for gap controller will result in jerking of the servo system that feeds the workpiece towards the electrode. Unstable and inefficient erosion and the increasing of electrode wear is then the effect of servo system jerks.

There exists a need to provide EDM equipment which ameliorates or overcomes one or more of the above-mentioned deficiencies or at the very least improves upon the performance of currently available EDM equipment. There also exists a need to provide EDM equipment which includes a better performing pulse controller and gap controller than currently available in commercial EDM equipment.

SUMMARY

One aspect of the invention provides an efficient method of detecting the condition of a gap between an electrode and a workpiece in electrical discharge machining (EDM) equipment. In this method, prior to generating an electrical discharge to remove material from the workpiece, a low energy checking pulse is applied across the gap during a checking phase period, and a short circuit gap state is inferred when the gap current exceeds a current threshold. In the absence of a short circuit gap state being detected during the checking phase period, the electrical discharge is able to be applied to remove material from the workpiece.

The method may also include the step of inferring an open circuit gap state after the electrical discharge is applied during a build-up phase period. This inference is made when the gap voltage exceeds an open circuit threshold for longer than a build-up phase period after the electrical discharge is supplied, and the gap current is less than the current threshold.

The method may further include the step of inferring a normal gap state after the build-up phase period and during discharge phase period. This inference is made when the gap voltage exceeds a normal threshold which is less than the open circuit threshold, and the gap current exceeds the current threshold.

The method may further include the step of inferring a short circuit gap state after the build-up phase period and during a discharge phase period. This inference is made when the gap voltage is less than the short circuit threshold which is less than both the open circuit threshold and the normal threshold, and the gap current exceeds the current threshold.

The method may further include the step of inferring an arc gap state after the build-up phase period and during a discharge phase period. This inference is made when the gap voltage exceeds the short circuit threshold but is less than the normal threshold, and the gap current exceeds the current threshold.

A further aspect of the invention provides a method of controlling the pulse timing for use in a pulse controller of EDM equipment. The pulse controller includes circuitry configured to receive gap voltage and current feedback signals, detect state of a gap between an electrode and a workpiece in the EDM equipment as described here above, and send MOSFET command signals to a power module which generates electrical discharges according to the gap state signals.

In case of a short circuit gap state, the timing of discharge phase ($T_{on}$) is interrupted to stop supplying discharge power to the eroding process. This could prevent the accumulation of debris that causes formation of slug in a very small gap distance. The predetermined timing of deionisation phase ($T_{off}$) is also extended to allow extra time for deionisation and removing of debris from the gap. In the case of arcing gap state, the predetermined timing of $T_{off}$ is further extended but the $T_{on}$ is not interrupted. $T_{off}$ will be reset to its predetermined timing after the gap condition is fully recover from the short circuit or arcing gap state to normal gap state. The present invention resolves the problems of accumulation of debris and inefficient and unstable erosion process by appropriately controlling the discharge pulse generation in the electric discharge machining power module according to the detected gap condition.

In the case of normal or arcing gap state, the discharge duration ($T_{on}$) is determined by the shape of current pulse which ensures that constant amount of energy per pulse is supplied to the eroding gap. The current pulse shape is computed by integrating the gap current feedback signal ($\int I\, dt$) during the discharge phase in the pulse timing controller. The duration of $T_{on}$ is determined by comparing ($\int I\, dt$) with a current integration threshold. The discharge duration will only expire if ($\int I\, dt$) is larger than the current integration threshold. The present invention delivers a constant amount of energy per discharge pulse to the gap regardless of the localised material's conductivity, which gives a better surface quality of the workpiece.

A further aspect of the invention provides EDM equipment for generating an electrical discharge to remove material from the workpiece. The equipment, according to this aspect, includes a controller for detecting the state of a gap between an electrode and a workpiece in the EDM equipment as described here, and a power module configured to generate the electrical discharges according to the MOSFET command signals from pulse controller.

In such equipment, the electrode may be arranged to be rotating and coolant flushed into the gap during electrical discharge. It will be appreciated however, that the present invention is applicable to other configurations of EDM equipment, and to arrangements in which the electrode does not rotate.

A still further aspect of the invention provides a method of generating a smooth servo feed command that is capable of controlling and maintaining the optimal gap distance between an electrode and a workpiece in an electrical discharge machining (EDM) equipment in which an electrical discharge is generated across the gap to remove material from the workpiece.

In this method, selection of gap controller gains depends on the state of gap condition. Large gap state occurs when the workpiece is far away from the electrode. In this state, it feedrate allows the workpiece to move towards the electrode at very high speed. Upon detection of first spark, it will move from a large gap state to a medium gap state. In this state the workpiece is feeding in at a higher speed then the erosion rate but slower than the maximum feedrate to achieve an optimum gap distance. Achieving optimum gap distance will allow the switching of gap state from medium state to normal erosion state. This will allow the workpiece to be fed uniformly towards the electrode at the erosion rate. In cases where the gap distance is getting narrower and inefficient flushing of debris from the gap occurs, it will move the gap state from a normal gap state to short circuit gap state by retracting the feeding of the workpiece to allow fresh dielectric to be flushed in the gap.

The switching of gap state is determined by the normalised average build-up phase time ($T_d\%$). If the normalised average build-up phase time ($T_d\%$) exceeds a maximum threshold, the gap condition will be in the large gap state, then the relative feed rate of a workpiece towards the electrode is set to a constant maximum rate.

In one or more embodiments of the invention, if the normalised average build-up phase time ($T_d\%$) exceeds a lower threshold and is less than a maximum threshold, then the gap state will move from large to medium state. In this state according to the feed rate control method the relative feed rate of the workpiece towards the electrode may be set as a function of the error between the build-up phase time and the lower threshold.

In one or more embodiments, the method may further include the step of, if the normalised average build-up phase time ($T_d\%$) is less than the lower threshold, the average gap energy that represents the change in gap distance will be used to calculate the relative feed rate of the workpiece towards the electrode, and it will be set as a function of the error between the average gap energy during the build-up phase and the reference energy.

In one or more embodiments, the method may further include the step of, if the normalised average build-up phase time ($T_d\%$) is less than the lower threshold and if the average gap energy during the build-up phase is less than an energy threshold, it will move the gap condition from normal to short circuit state, setting the relative feed rate of the workpiece away from the electrode is calculated as a function of the average gap energy during the build-up phase and energy threshold.

A still further aspect of the invention provides EDM equipment for generating an electrical discharge to remove material from the workpiece, the equipment including a controller for controlling the feed rate of the workpiece as described here, and servo system means for displacing the workpiece in response to a signal from the controller.

A further aspect of the invention provides a gap controller for use in EDM equipment. The gap controller including circuitry configured to receive average gap energy and average build up phase time, derived from gap voltage, gap current feedback signals, and a pulse controller; generate feed rate control signals from the average gap energy and average build up time; and send the feed rate control signals through a servo system means to control the feed rate of a workpiece.

BRIEF DESCRIPTION OF THE DRAWINGS

The invention will now be described in further detail by reference to the accompanying drawings. It is to be understood that the particularity of the drawings does not supersede the generality of the preceding description of the invention.

DETAILED DESCRIPTION

Figure 1:
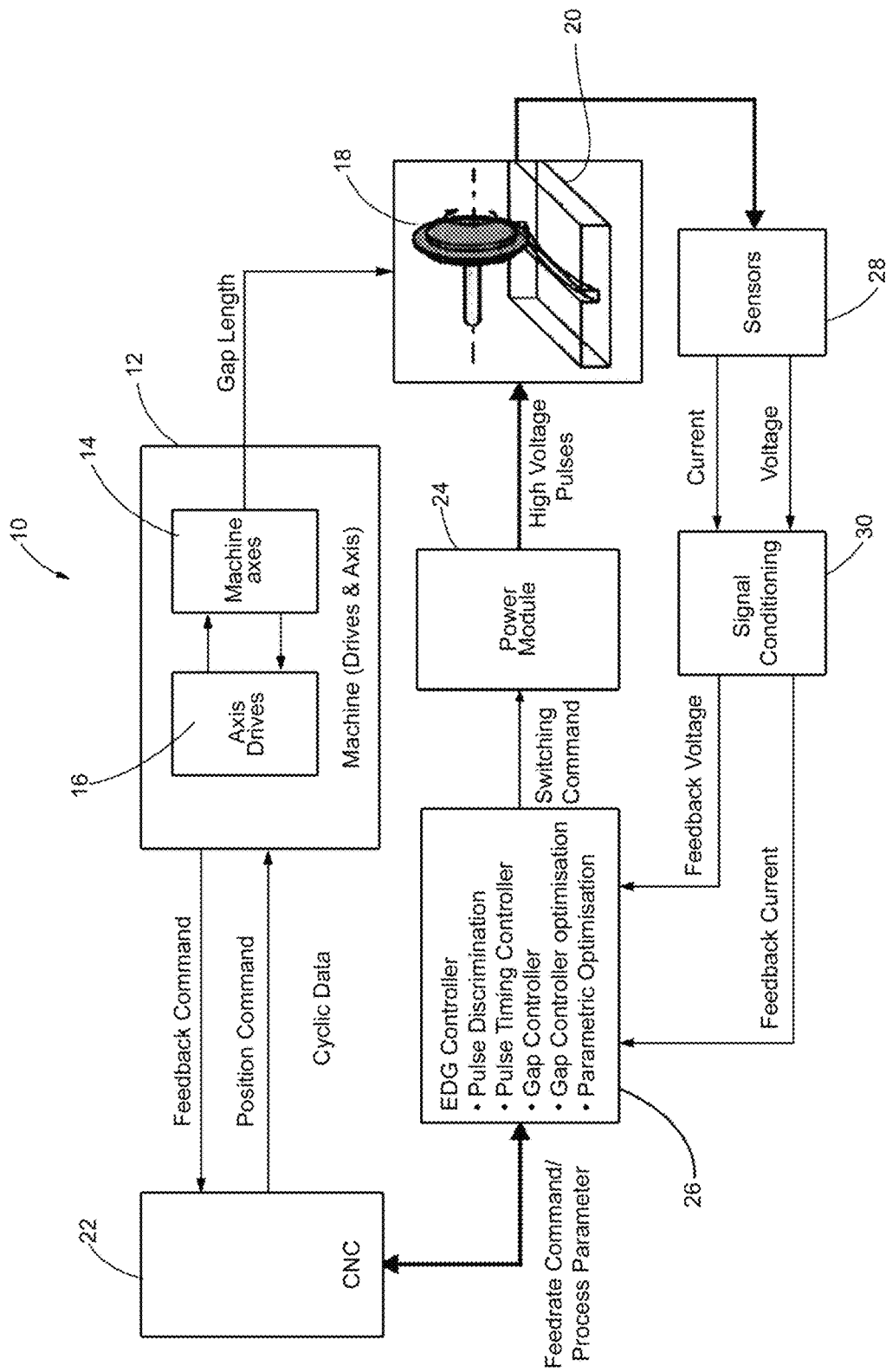
FIG. 1 is schematic diagram showing basic components of an electrical discharge machining (EDM) equipment.

Referring now to FIG. 1, there is shown generally electrical discharge machining (EDM) equipment 10. The equipment 10 includes a multi-axis machine 12 including a number of machine axes 14 driven by corresponding axis drives 16 in order to position and rotate an electrode 18 in relation to a workpiece 20. The multi-axis machine 12 is controlled by a computer numerical controller (CNC) 22 which acts to automate the various machining processes implemented by the multi-axis machine 12. An example of a CNC controlled multi-axis machine is provided in U.S. Pat. No. 5,604,677 in the name of the present Applicant.

The EDM equipment 10 further includes a power module 24 for applying rapidly recurring current discharges to the gap between the electrode 18 and the workpiece 20 in order to remove material there between. Operation of the power module 24 is governed by an EDM controller 26 providing pulse discrimination, pulse timing control, gap control, gap controller optimisation and parameter optimisation for the EDM process.

The EDM equipment 10 further includes a series of sensors 28 for transmitting gap current and gap voltage signals to a signal conditioning unit 30 which in turn provides feedback current and voltage signals to the EDM controller 26.

Figure 2:
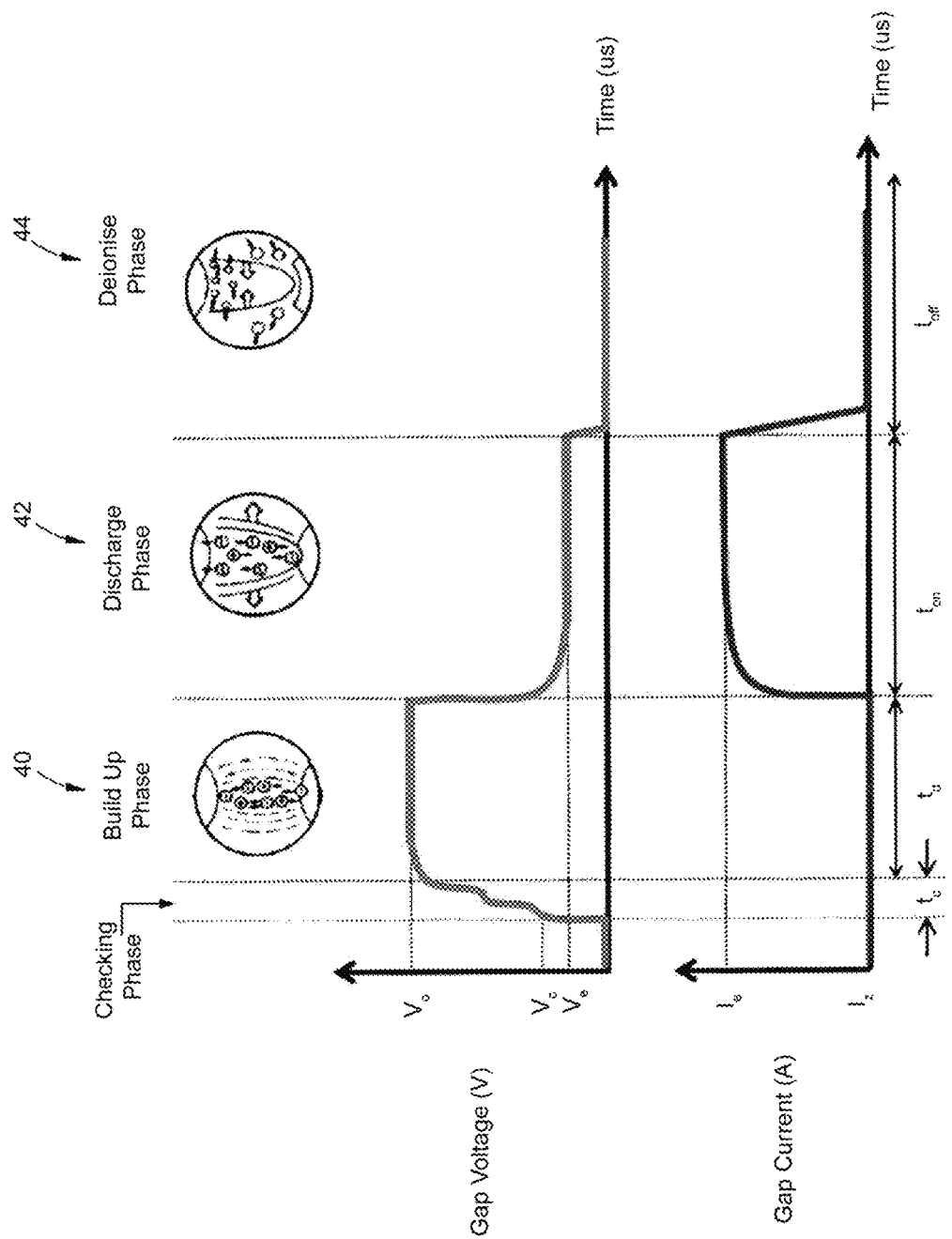
FIG. 2 is a graph showing idealised gap voltage and gap current occurring during application of a DC voltage pulse across the gap between a workpiece and a tool in EDM equipment.

As shown in FIG. 2, several phases can be identified during an EDM process. During checking phase a low energy pulse is applied across the gap in detecting the condition of the gap before initiating a high voltage pulse. During an initial build-up phase 40, a no-load voltage $V_o$ is applied across the workpiece/tool gap. Typically, this no-load voltage $V_o$ has a range of values between 60 volts and 400 volts.

Upon establishment of the no-load voltage $V_o$, a strong electric field is established between the electrode 18 and the workpiece 20. Due to the attractive force of the electric field, at the shortest local distance between the tool and the workpiece (the gap) there is a build-up of particles from the machining process which float in the dielectric fluid. This forms the electrical breakdown and the electrons begin to move towards the positively charged electrode in a discharge phase 42. On their way, the associated electrons collide with the neutral particles from the machining process and the dielectric fluid.

An avalanche ionisation process is set off, in which a large number of negative and positive ions are generated in the discharge phase 42. The ionisation initiates creation of an electro-conductive zone between the workpiece and the tool, thus causing electrical discharge. Through electrical discharge, electrical energy is transformed into thermal energy. A discharge zone is formed at temperatures as high as 40,000° Celsius. Such high temperatures cause local heating, melting, evaporation and incineration of the workpiece.

In the discharge phase 42, the gap voltage decreases from the no-load voltage $V_o$ to a discharge voltage $V_e$. Discharge current increases during the discharge phase from zero to a maximum discharge current value $I_e$ (a typical current range from 0.5 amps to 30 amps) during discharge duration time $T_{on}$ (typically 500 nanoseconds to 1 milliseconds).

At the end of discharge duration ($T_{on}$), the MOSFET is switched off, causing a disruption of the gap current supply. This results in the annihilation of the discharge zone, causing abrupt cooling which leads to an explosive flushing of melted matter and solid particles of the workpiece surface in the deionise phase 44.

The EDM controller 26 acts to control the feed rate of the electrode 18 with respect to the workpiece 20 in order to maintain an appropriate gap there between, as well as causing application of a series of rapidly recurring DC voltage pulses between electrode 18 and the workpiece 20 in order to remove material from the gap. The EDM controller 26 also acts to monitor various machine parameters in order to optimise the machining process and prevent application of the DC voltage pulses under undesirable gap states.

Figure 3:
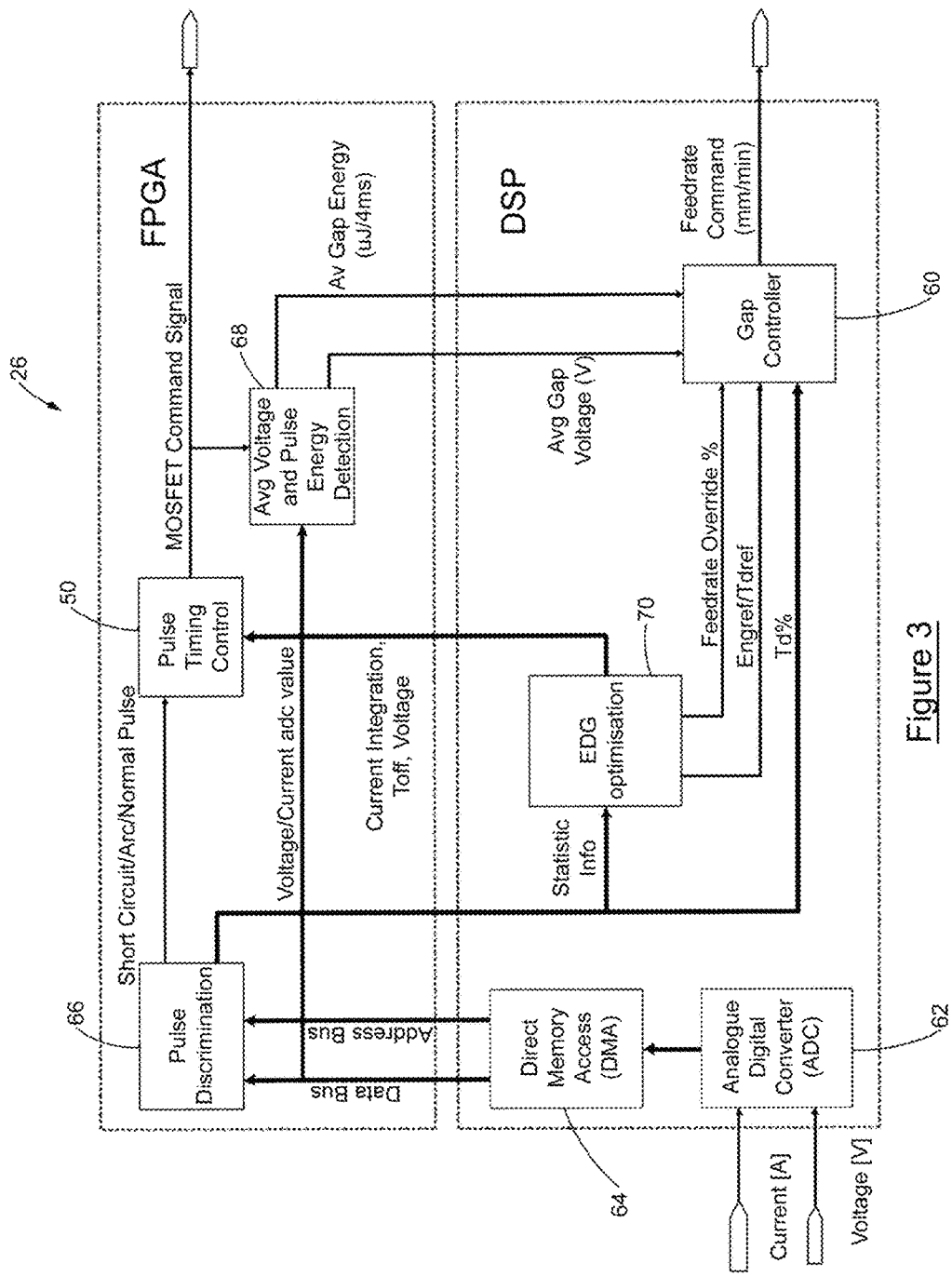
FIG. 3 is a schematic diagram showing elements of a pulse controller and gap controller forming part of the EDM equipment shown in FIG. 1.

FIG. 3 shows various elements forming part of the EDM controller 26 including a pulse timing controller 50, a gap controller 60, an Analogue-to-Digital (AD) converter 62, Direct Memory Access (DMA) 64, pulse discrimination unit 66, a computation unit 68 and an EDM optimisation unit 70. As can be seen from this figure, several of these elements are implemented in Digital Signal Processing (DSP) technology whilst other elements are implemented by a Field Programmable Gate Arrays (FPGA). In operation, the feedback voltage and current signals from the signal conditioner 30 representative of the gap current and voltage measured by the sensors 28, are provided to the analogue to digital converter 66 for digitisation. The digitised current and voltage signals are then transferred to FPGA memory via direct memory access channels without interrupting DSP's CPU 64.

The pulse discrimination unit 66 accesses the digitised current and voltage values stored in the DMA 64 in order to infer the state of the gap between the electrode and the workpiece. To assist in this determination, the pulse discrimination unit 66 stores a series of current and voltage thresholds, represented in FIG. 4. In this example, the pulse discrimination unit 66 stores a current threshold $I_T$, an open circuit voltage threshold $V_{TOC}$, a normal gap state voltage threshold $V_{TN}$, an arc gap state voltage threshold $V_{TA}$ and a short circuit gap state voltage threshold $V_{TSC}$. The pulse discrimination unit 66 relies upon the values of the voltage and current read from the DMA and compute the average discharge voltage and current 64 The comparison made to each other and to the stored voltage and current thresholds in order to infer the state of the gap between the workpiece 20 and the tool 18.

Together with timing control information from the EDM optimisation unit 70, the pulse controller 50 relies upon the gap state information from the pulse discrimination unit 66 to selectively generate switching commands to control operation of the power module 24 and thus generating the high voltage pulses used in the EDM process. The computation unit 68 computes average voltage and average pulse energy from a series of pulses applied across the electrode/workpiece gap.

In that regard, the pulse controller 50 and gap controller 60 run at different software cycles. The pulse discrimination 66 acts to check the gap state (pulse type) every single discharge pulse (which may typically be between 0.5 and 300 microseconds). The gap controller 60 runs at a much slower cycle. In a single gap control cycle (which may typically be from 1 to 4 milliseconds long), many discharge pulses can take place. In order that feedback signal provided from the computation unit 68 to the gap controller 60 is optimised, average values of voltage and pulse energy are computed and stored by the computation unit 68 for use by gap controller 60.

The EDM optimisation unit 70 provides reference timing information to the pulse timing controller 50 as well as providing a series of control signals to the gap controller 60 in order for a feed rate command signal to be generated and provided to the computer numeric controller 22 which controls the advancement of the tool 18 at the desired rate.

The EDM operations performed by the pulse discrimination unit 66 and the pulse logic controller 50 will now be explained with reference to FIGS. 5 and 6.

Figure 5:
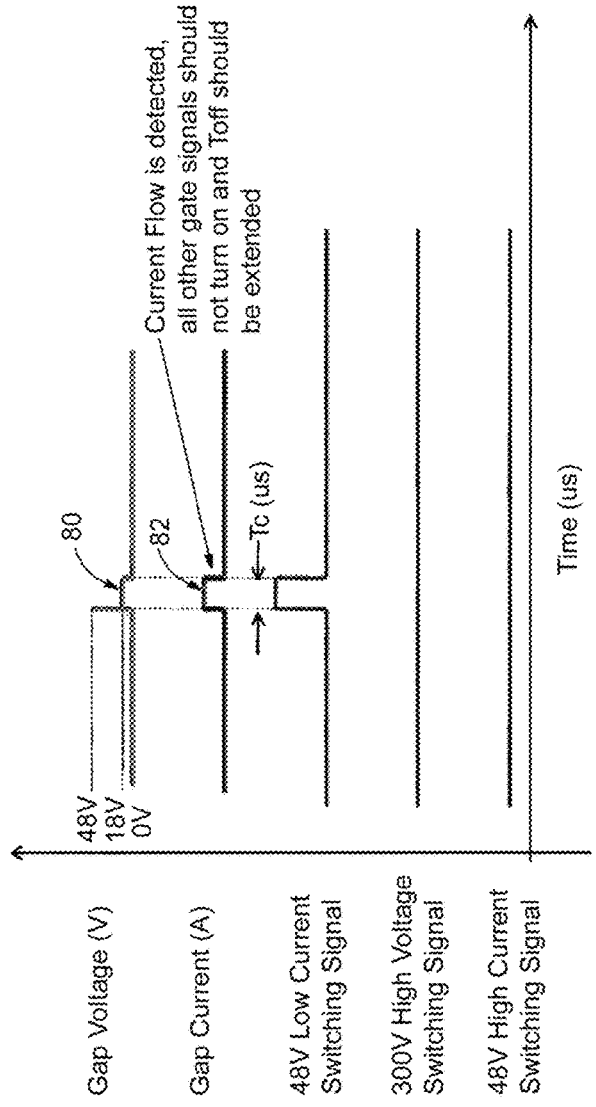
FIG. 5 shows gap voltage, gap current and a series of switching signals from the EDM equipment depicted in FIG. 1 during application of a checking pulse across the workpiece/tool gap.

FIG. 5 depicts the application of a checking pulse 80 across the workpiece/tool gap. In this example, a low energy checking pulse having a value of 48 volts is applied across the gap, but current flow 82 is immediately detected across the gap. The pulse discrimination unit 66 determines that the current detected during this checking phase exceeded the current threshold $I_T$ and thereby infers that a short circuit exists across the gap. In this case, application of high voltage pulse across the gap would be harmful to the building up of debris and electrode wear. The counter for checking phase period ($T_c$) and discharge phase period ($T_{on}$) will be interrupted. It can also be seen from this figure that whilst a 48V low current switching signal is applied during the checking phase period, the current flow across the gap during this checking phase results in no high voltage switching signal or high current switching signal being generated. The timing for deionise phase ($T_{off}$) is further extended from the predefined timing depending on the gap state of previous pulse. If the gap state of previous pulse is short circuit, the $T_{off}$ is further extended from the previous stored $T_{off}$ value. The $T_{off}$ value will reset to its predefined timing after the gap state is recovered from short circuit to normal state.

Figure 6:
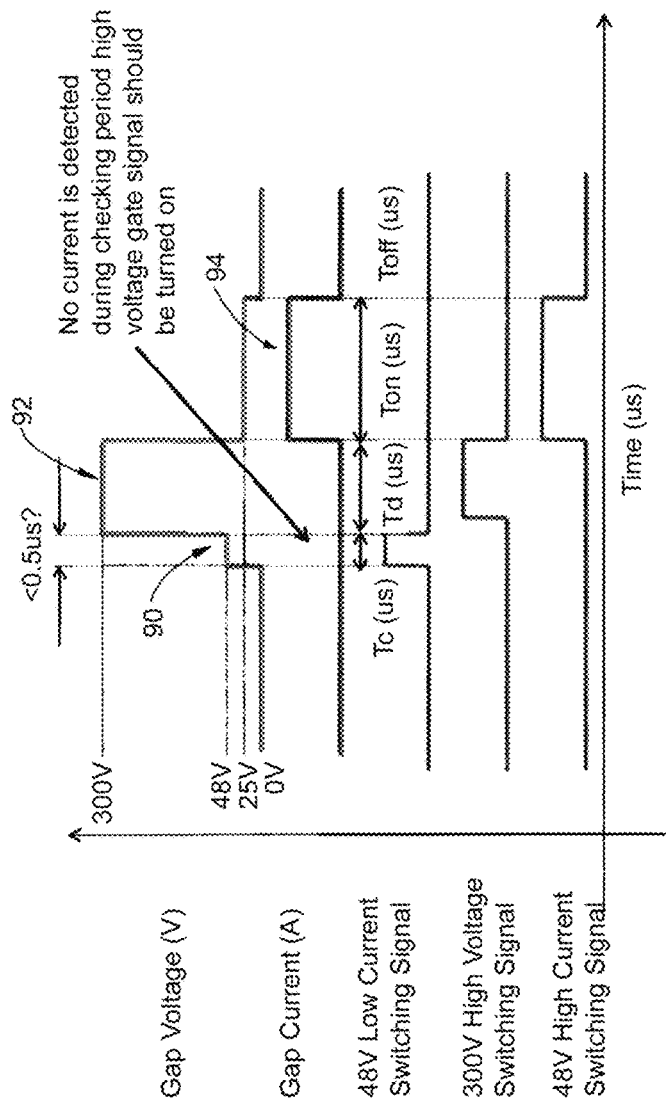
FIG. 6 shows the gap voltage, gap current and switching signals present in the EDM equipment shown in FIG. 1 during the application of a DC voltage pulse across the gap between the workpiece and the tool during operation of the equipment.

Referring now to FIG. 6, a low energy pulse 90 having a value of 48 volts is applied across the gap, but no current flow is immediately detected across the gap, which means the gap is filled with fresh dielectric. Since a short circuit gap state is not detected during the checking phase period, the power module 24, under control of the pulse timing controller 50, causes establishment of a high voltage pulse 92 (in this example, having a value of 300 volts) across the gap. A counter in the pulse timing controller 50 for counting the total ignition delay time ($T_d$) is initiated. Depending on the gap distance, gap current 94 starts to flows in the discharge phase of the EDM process once the plasma channel is established. During the discharge duration time $T_{on}$, the gap voltage falls (in this example) to a value of 25 volts.

Figure 9:
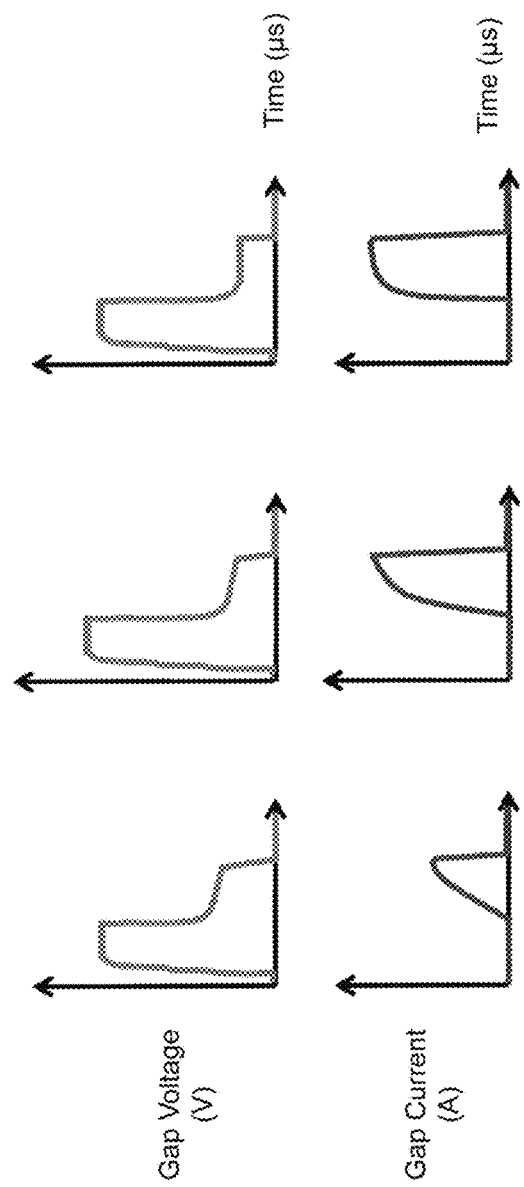
FIG. 9 shows different current pulse waveform that can be expected when eroding materials with different conductivity.

The discharge duration ($T_{on}$) is determined by the current pulse shape. Referring to FIG. 9, the current pulse shape can varies according to the conductivity of workpiece material. To achieve a better surface quality of the workpiece, the total energy per pulse has to be controlled to prevent overheating of localise area by checking the current pulse shape. The current pulse shape is determined by computing the integration of the gap current feedback signal ($\int I \, dt$) during the discharge phase in the pulse timing controller 50. The duration of $T_{on}$ is determined by comparing ($\int I \, dt$) with a current integration threshold which is provided by the EDG optimisation block 70. If ($\int I \, dt$) is larger than the current integration threshold, the discharge duration will expire, or else the $T_{on}$ will continues till its reached its threshold. At the end of the discharge phase, both the gap voltage and gap current are switched off and are therefore expected to fall to zero during the deionisation phase.

Figure 8:
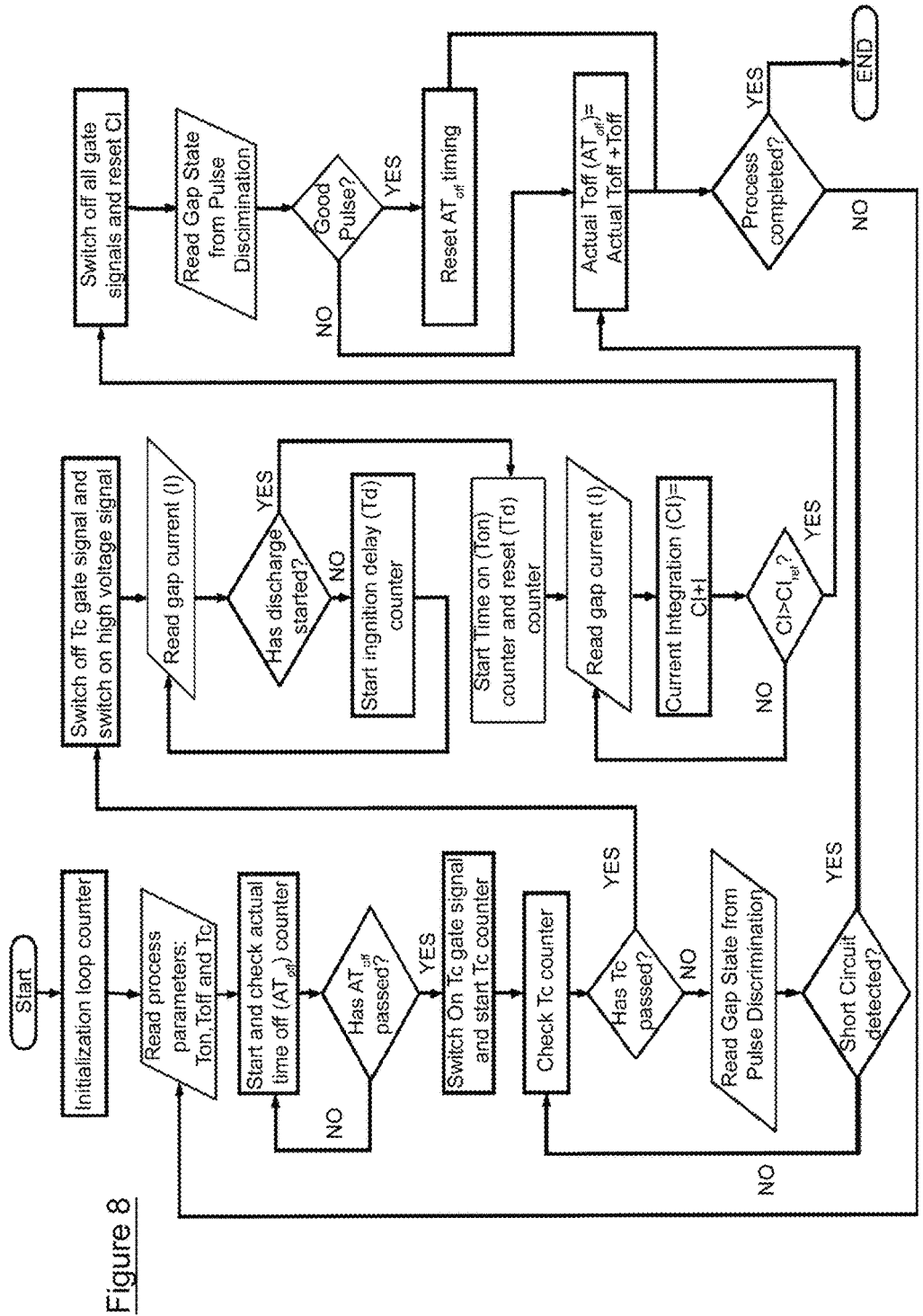
FIG. 8 is a flowchart depicting computational steps performed by the pulse controller shown in FIG. 3 during application of a DC voltage pulse across the gap between the workpiece and the tool during operation of the equipment.

As has been shown in FIG. 8, during the idealised EDM process depicted in FIG. 6, the EDM controller 26 acts to measure various parameters in order to detect the state of the gap between the electrode 18 and workpiece 20 and if necessary take a corrective action.

Figure 4:
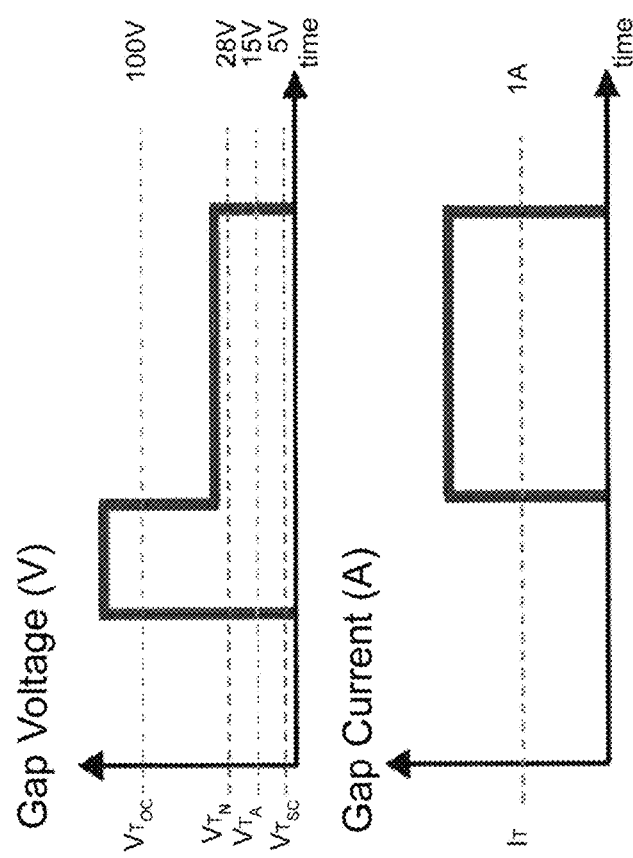
FIG. 4 depicts gap voltage and current thresholds used by the pulse controller and gap controller shown in FIG. 3.

For example, if after the high gap voltage is applied during the build-up phase $T_d$, an open circuit gap state is inferred by the EDM controller 26 when the gap voltage exceeds the open circuit threshold $V_{TOC}$ shown in FIG. 4 for longer than a predefined build-up phase period $T_d$ after the high voltage is applied, and if the gap current is less than the current threshold IT. Having detected an open circuit gap state, the EDM controller continue to apply high voltage to the gap until gap current is larger than current threshold IT.

However, if the gap voltage is determined to exceed the normal voltage threshold $V_{TN}$ which is less than the open circuit threshold $V_{TOC}$ after the build-up phase period $T_d$ and during the discharge phase period $T_{on}$ and if the gap current exceeds the current threshold $I_T$, then the controller 26 infers a normal gap state requiring no corrective action to take place.

A short circuit gap state is inferred by the controller 26 after the build-up phase period $T_d$ and during the discharge phase period $T_{on}$ when the gap voltage is less than the short circuit threshold $V_{TSC}$ which is less than both the open circuit threshold $V_{TOC}$ and the normal threshold $V_{TN}$, and the gap current exceeds the current threshold $I_T$ having inferred that a short circuit gap state exists, the discharge duration time ($T_{on}$) will be interrupted and sends 0V MOSFET command signals from the controller 26 to the power module 24 in order to switch off the discharge pulse applied to the gap. The deionise phase duration ($T_{off}$) will be extended to provide extra time for removing debris from the gap.

Similarly, an arc gap state is inferred by the controller 26 after the build-up phase period $T_d$ during the discharge phase period $T_{on}$ when the gap voltage exceeds the short circuit threshold $V_{TSC}$ but is less than the normal threshold $V_{TN}$, and the gap current exceeds the current threshold. Once again detection of the arc gap state will further extend the deionise phase duration.

It will be appreciated from the foregoing that following detection of the gap state between the electrode 18 and workpiece 20 according to the foregoing techniques, the EDM controller 26 acts to selectively generate electrical discharges across the gap according to the detected gap state. In this manner application of harmful pulses across the gap during short circuit, arc and open circuit gap states is minimised.

In conjunction with gap state detection so as to avoid of the application of harmful pulses to the gap, the EDM controller 26 generates feed rate commands for use by the computer numerical controller 22 to control the feed rate of the electrode 18 as a function of feedback signals.

Figure 7:
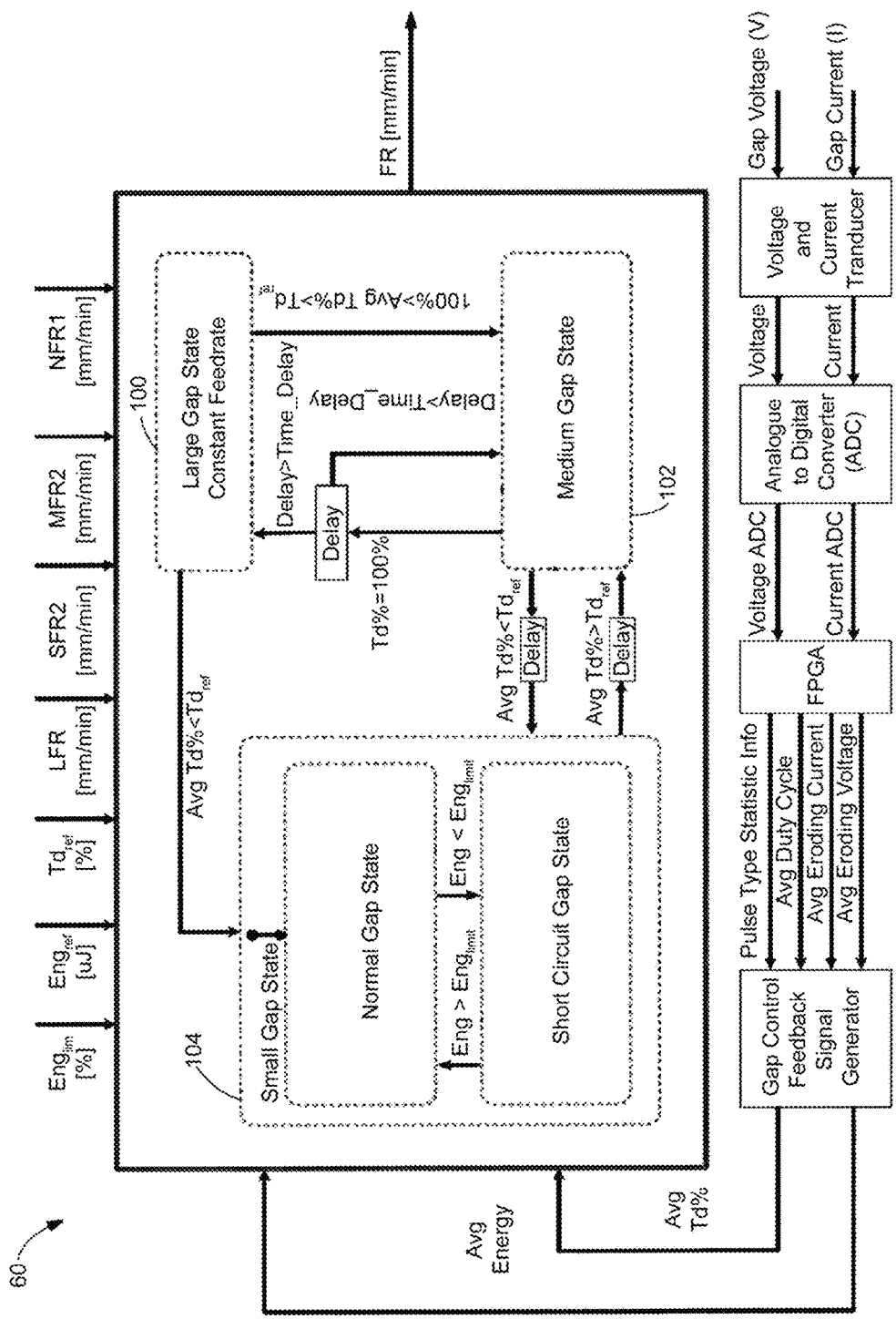
FIG. 7 is a schematic diagram showing computational blocks of the gap controller shown in FIG. 3.

An overview of elements forming part of the gap controller 60 is depicted in FIG. 7. The gap controller 60 includes three separate control components 100 to 104 for applying different feedback control algorithms to the electrode feed rate according to the size of the electrode/workpiece gap.

If the normalised average build-up phase time ($T_d\%$) over the pulse cycles occurring in between consecutive gap control cycles exceeds a maximum threshold, it shows the workpiece distance from the electrode is very large. The large gap state control component 100, acts to set the relative feed-rate of workpiece towards electrode to a constant maximum rate.

If the normalised average build-up phase time ($T_d\%$) over the pulse cycles occurring in between consecutive gap control cycles exceeds a lower threshold $T_{dref}$ but is less than a max threshold, it shows the eroding process starts to take place, then the medium gap state control component 102 acts to set the relative feed-rate of workpiece towards electrode as a function of the error between build-up phase time $T_d$ and lower threshold $T_{dref}$. This state is to allow the gap controller to reduce the gap between the workpiece and electrode to an optimum distance for erosion.

The small gap state control component 102 applies one of two different feedback control algorithms depending upon the gap state. If the average build-up phase time $T_d$ is less than the lower threshold $T_{dref}$ and if the average gap energy during the build-up phase exceeds an energy threshold $Eng_{ref}$, then a normal gap state is inferred. In this state, an optimum gap distance is achieved; the feedrate controller will feed the workpiece towards the electrode according to the speed of change in gap distance. The small gap state control component 102 sets the relative feed-rate of workpiece towards electrode as a function of the error between average gap energy during the build-up phase and Energy threshold ($Eng_{ref}$).

However, if the normalised average build-up phase time ($T_d\%$) is less than the lower threshold ($T_{dref}$) and if the average gap energy during the build-up phase is less than an Energy threshold $Eng_{ref}$, then a short circuit gap state is inferred. In this case, the small gap state control component 104 sets the feed-rate of workpiece away from electrode as a function of the average gap energy during the build-up phase and Energy threshold $Eng_{ref}$.

A method that uses average gap voltage as feedback signal does not accurately represent the actual gap condition and the speed of change in gap distance. In this invention the objective of gap controller is to control the rate of change in gap distance as opposed to the normal perception of controlling the gap distance. Erosion rate that determines the change in gap distance will vary depending on the actual gap distance, thus giving the objective of controlling the gap distance a challenging task. Average gap voltage signal is shown to be stochastic, it's varies under various uncontrolled physical condition such as dielectric condition, electrode condition, the condition of workpiece regardless of the change in gap distance. The gap controller will not be required to respond to such chaotic and unpredictable phenomena, responding to such phenomena will again cause jerking in servo feed command and unstable erosion process is thus the results. In this invention, average gap energy that represents the change in gap distance is used as feedback signal for gap controller. For a fixed eroding area, the rate of change in gap distance is shown to be proportional to the total energy supplied to eroding gap. By calculating the average energy input into the gap, the rate of change in gap distance can be estimated. A smooth servo feed command can be generated from the gap controller and the workpiece is constantly feed towards the electrode without jerking.

In the implementation shown in FIG. 7, each of the threshold values and feedback values are normalised. That is, the threshold values have a unitary value and feedback values have value less than "1." Such an arrangement enables the three control components 80 to 82 to produce a feed rate gain coefficient which is used to multiply a maximum feed rate value.

Although in the above described embodiments the invention is implemented primarily using FPGA and DSP techniques, in other embodiments the invention may be implemented primarily in software, firmware or hardware using, for example, hardware components such as an application specific integrated circuit/s (ASICs). Implementation of a hardware state machine so as to perform the functions described herein will be apparent to persons skilled in the relevant art. In other embodiments, the invention may be implemented using a combination of both hardware and software.

While the present invention has been described in conjunction with a limited number of embodiments, it will be apparent to those skilled in the art that many alternatives, modifications and variations in light of the foregoing description are possible. Accordingly, the present invention is intended to embrace all such alternatives, modifications and variations as may fall within the spirit and scope of the invention as disclosed.

The claims defining the invention are as follows:

1. A method of controlling electrical discharges in EDM equipment, the method including the steps of:
   detecting the state of a gap between an electrode and a workpiece in the EDM equipment by, prior to generating an electrical discharge to remove material from the workpiece, applying a low energy checking pulse across the gap during a checking phase period ($T_c$), and inferring a short circuit gap state when the gap current exceeds a current threshold ($I_T$), and
   selectively generating the electrical discharges according to the detected gap state;
   wherein the detected gam state comprises at least one of the short circuit gap state, an arcing gap state, and a normal gap state;
   wherein when the short circuit gap state is inferred there will be no discharge pulse applied into the gap, the timing of discharge phase $T_{on}$ will be interrupted, and the deionise phase timing is extended;
   wherein when the arcing gap state is inferred the deionise phase will be further extended after the discharge phase;
   wherein when the normal gap state is inferred, the deionise phase timing will be reset to its predetermined thine; and
   wherein discharge phase timing is controlled according to the current pulse shape, and the current pulse shape is determined by computing the integration of current pulse during discharge phase.

2. A method according to claim 1, wherein the integrated current pulse is compared with a current integration threshold, and where the integrated current is larger than its threshold, then the discharge phase will cease.

3. A method of generating a smooth servo feed command that is capable of controlling and maintaining the optimised gap between an electrode and a workpiece in an electrical discharge machining (EDM) equipment in which an electrical discharge is generated across the gap to remove material from the workpiece, the method including the step of:
   if an normalised average build-up phase time ($T_d$%) exceeds a maximum threshold, setting the relative feed-rate of workpiece towards electrode to a constant maximum rate.

4. A method according to claim 3, and further including the step of:
   if the normalised average build-up phase time ($T_d$%) exceeds a lower threshold ($T_{dref}$) and is less than a max threshold, then setting the relative feed-rate of workpiece towards electrode as a function of the error between build-up phase time ($T_d$) and lower threshold ($T_{dref}$).

5. A method according to claim 3, and further including the step of:
   if the normalised average build-up phase time ($T_d$%) is less than the lower threshold ($T_{dref}$) and if the average gap energy during the build-up phase the exceeds an Energy threshold ($Eng_{ref}$), then setting the relative feed-rate of workpiece towards electrode as a function of the error between average gap energy during the build-up phase and Energy threshold ($Eng_{ref}$).

6. A method according to claim 3, and further including the step of:
   if the normalised average build-up phase time ($T_d$%) is less than the lower threshold ($T_{dref}$) and if the average gap energy during the build-up phase is less than an Energy threshold ($Eng_{ref}$), setting the relative feed-rate of workpiece away from electrode as a function of the average gap energy during the build-up phase and Energy threshold ($Eng_{ref}$).

7. EDM equipment for generating an electrical discharge to remove material from the workpiece, the equipment including:
   a controller for controlling the feed-rate of a workpiece according to claim 3; and
   servo system means for displacing the workpiece in response to signals from the controller;
   wherein the electrode is arranged to he rotated and coolant flushed into the gap during the electrical discharge; and
   wherein the average gap energy and average build up phase time is used as a feedback signal for the gap controller.

8. A gap controller for use in EDM equipment, the gap controller including circuitry configured to:
   receive average gap energy and average gap voltage signals, derived from gap voltage and gap current feedback signals, from a pulse controller;
   generate feed-rate control signals from the average gap energy and average gap voltage signals; and
   send the feed-rate control signals to a servo system means to control the feed-rate of a workpiece.

* * * * *